United States Patent [19]
Nishikawa et al.

[11] Patent Number: 4,720,626
[45] Date of Patent: Jan. 19, 1988

[54] IC CARD PROCESSING METHOD AND PROCESSING DEVICE THEREFOR, AND IC CARD

[75] Inventors: Seiichi Nishikawa; Koichi Okada; Teruaki Shiro, all of Tokyo, Japan

[73] Assignee: Dai Nippon Insatsu Kabushiki Kaisha, Japan

[21] Appl. No.: 695,859

[22] PCT Filed: May 18, 1984

[86] PCT No.: PCT/JP84/00247
§ 371 Date: Jan. 14, 1985
§ 102(e) Date: Jan. 14, 1985

[87] PCT Pub. No.: WO84/04612
PCT Pub. Date: Nov. 22, 1984

[30] Foreign Application Priority Data
May 18, 1983 [JP] Japan .................................. 58-85799

[51] Int. Cl.$^4$ ............................................. G06K 7/08
[52] U.S. Cl. ................................. 235/449; 235/492; 340/825.54
[58] Field of Search ........................ 235/449, 492, 493; 340/825.54, 573

[56] References Cited
U.S. PATENT DOCUMENTS

| 4,029,945 | 6/1977 | Yamada et al. | 235/492 X |
| 4,165,033 | 8/1979 | Nielsen et al. | 235/449 X |
| 4,333,072 | 6/1982 | Beigel | 235/449 |
| 4,550,444 | 10/1985 | Uebel | 340/825.54 |
| 4,600,829 | 7/1986 | Walton | 235/492 X |

FOREIGN PATENT DOCUMENTS 52-150937 12/1977 Japan .
54-57756 5/1979 Japan .

*Primary Examiner*—David L. Trafton
*Attorney, Agent, or Firm*—Parkhurst & Oliff

[57] ABSTRACT

The present invention discloses an IC card, and a processing device for the IC card and a processing method therefor. The IC card comprises a semiconductor IC in which a large number of data are stored. There are provided a winding which picks up an electromagnetic field for forming a power current with respect to the semiconductor IC, and another winding and a Hall element for picking up the data of the semiconductor IC or writing the data into the semiconductor IC. These semiconductor IC, windings and the Hall element are all assembled within a card member of plastics. A device for processing this card comprises a winding for forming an electromagnetic field as a source of power current, another winding and a Hall element for transmitting data to the IC card and receiving it therefrom, and a circuit cooperative with these windings and the Hall element. These IC card and the processing device electromagnetically effects transmission of power current and data in accordance with so called a non-contact system.

2 Claims, 4 Drawing Figures

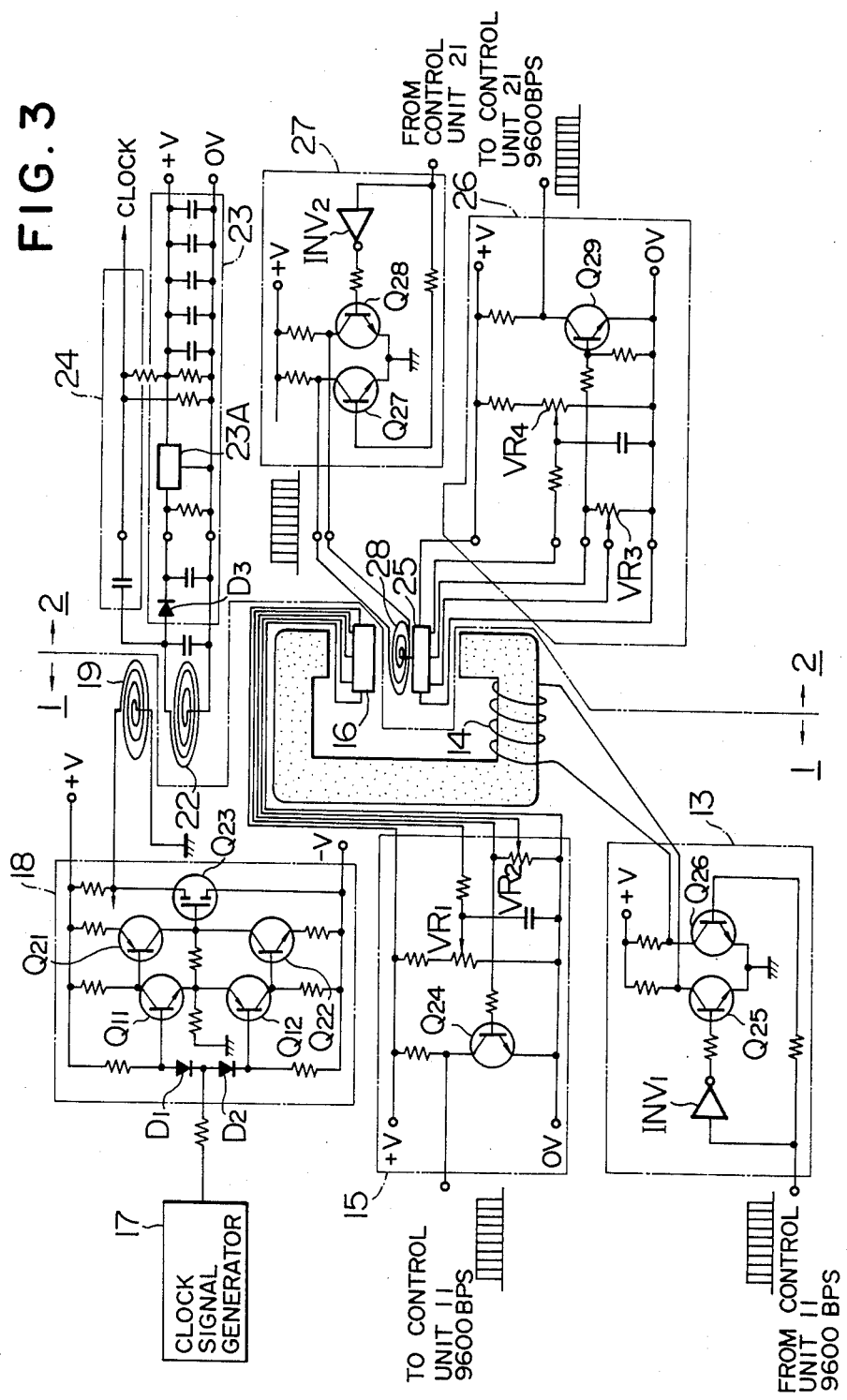

IC CARD PROCESSING METHOD AND PROCESSING DEVICE THEREFOR, AND IC CARD

TECHNICAL FIELD OF THE INVENTION

The present invention relates to so called an integrated circuit card (IC card) in which an electronic circuit including a microcomputer and a memory (particularly, a non-volatile memory) is incorporated, and a device which transmits data to the IC card and receives it therefrom and a method therefor.

BACKGROUND ART OF THE INVENTION

Recently, IC cards on which a semiconductor IC is mounted have been utilized, instead of magnetic cards widely used e.g. in banks etc. To effect data transmission and its reception between an IC card and a card processing device, a method of electrically connecting the IC card to the card processing device in a contact manner has been usually employed. With this method, the data transmission between the IC provided in the IC card and the card processing device, and the supply of power and a clock signal to the IC are carried out by actually flowing an current through contacts.

However, this contact system requires that contact electrodes are exposed to the card surface, resulting in drawbacks that dusts and the like are attached to the contacts or the contacts are damaged to cause defective or imperfect contact condition, and troubles occur because electrostatic noise is coupled to the contacts, etc. Namely, such spoiled or damaged contacts are unable to securely transmit signals. This prevents the IC card from normally operating, or causes an error in data transfer. Particularly, in the event that a portion or portions between contacts is or are short circuited due to the adhesion of impurities, an erroneous operation of the IC card would occur. Further, when an unexpected high voltage due to electrostatically induced charges etc. is applied, there occurs inconvenience that the IC is the card would be broken, resulting in damage of function of the card itself, loss of data recorded in the card or the like.

For this reason, in stead of such a contact system, some IC cards and processing devices therefor based on non-contact system have been already proposed.

However, any one of non-contact systems is functionally insufficient as compared with the abovementioned contact system.

Namely, one of non-contact systems is limited to the application in which information stored in advance in the IC card is only output to the card processing device, that is, to the application of unidirectional transmission. Another non-contact system is also proposed, which selectively reflects radio wave having a predetermined frequency transmitted from the card processing device in accordance with parameters set to each card. However, with this system, the information rendered by the IC card is of fixed nature, and therefore limited function can be only provided.

An attention is now drawn to a power supply for IC cards. Usually, a solar cell is employed or a contact system is partially used only when a power is supplied. In the former case, viz., when the solar cell is used, the power consumed in the IC card can be obtained, but it is unable to transmit a clock signal required for computer operation to the card processing device and receive it therefrom thus making it impossible to realize highly improved function. On the other hand, in the latter case, although the contact system is employed only in a power supply circuit, occurence of problems due to such contact system cannot be avoided.

Accordingly, it is highly desirable to provide a processing system for IC card, which has the same function as that of the contact system and can eliminate various inconveniences encountered therewith.

DISCLOSURE OF THE INVENTION

With the above in view, an object of the present invention is to provide a processing system for IC card, which performs processing in a non-contact manner and has the same function as that of the contact system.

In order to attain this object, according to the present invention, the supply of a clock signal and a power to an IC card is effected using a first magnetic signal having the same frequency as that of the clock signal, and a bidirectional data transmission between the IC card and a card processing device is effected using a second magnetic signal of data transmission and reception, which is different from the first magnetic signal.

Thus, this makes it possible to effect IC card processing so that highly improved function equivalent to that of the contact system can be performed while the non-contact system is employed.

BRIEF DESCRIPTION OF THE DRAWINGS

FIG. 3 shows a circuit diagram for power supply circuit and data transmission/reception circuit in the processing device and the IC card shown in FIGS. 2A and 2B.

BEST MODE FOR PRACTICING THE INVENTION

Figure 1:
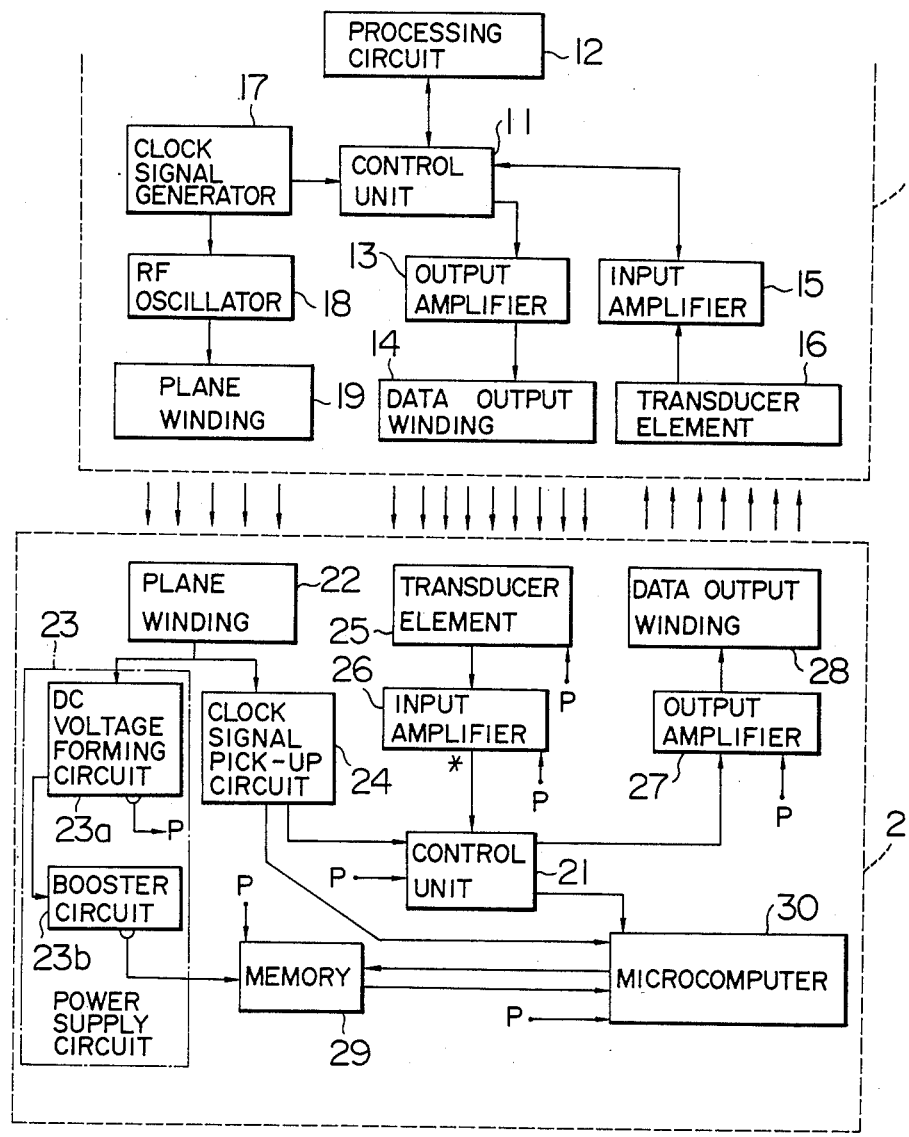
FIG. 1 is a block diagram illustrating a whole construction of a preferred embodiment according to the present invention.

In FIG. 1, reference numeral 1 denotes a card processing device constituted so that a magnetic signal can be transmitted to an IC card 2 and received therefrom.

The construction of the card processing device 1 will be first described, and then that of the IC card 2 will be referred to.

The card processing device 1 effects data transmission/reception by means of a control unit 11 in accordance with a clock signal from a clock signal generator 17 in cooperation with a processing circuit 12. Data to be transmitted are amplified by an output amplifier 13 to be transmitted toward the IC card 2 as a magnetic signal through a data output winding 14. On the other hand, a magnetic signal from the IC card 2 is detected by a transducer element 16 for data input and then is amplified by an input amplifier 15. Thus, the magnetic signal is received by the control unit 11. Further, an output of the clock signal generator 17 is transmitted toward the IC card 2 through an RF (radio frequency) oscillator 18 and a plane winding 19 for power supply.

The IC card 2 is constituted so that magnetic signals can be transmitted to the card processing device 1 and received therefrom by making use of a plane winding 22 for power reception, a transducer element 25 for data input and a plane winding 28 for data output. The plane winding 22 for power reception is connected to a power supply circuit 23 and a clock signal pick-up circuit 24. In the power supply circuit 23, a power supply voltage P to be supplied to each circuit component in the IC card 2 is created by a d.c. voltage forming circuit 23a, and a voltage required when data is written with respect to a memory 29 is created by a booster circuit 23b. In the clock signal pick-up circuit 24, a signal from the plane winding 22 for power reception is wave-shaped to form a clock signal to feed it to a control unit 21 and a microcomputer 30.

An output of a transducer 25 for data input is amplified by an input amplifier 26 to be supplied to the control unit 21. A signal to be transmitted to the card processing device 1 is supplied to a plane winding 28 for data output from the control unit 21 through an output amplifier 27, so that the signal is transmitted as a magnetic signal. The signal transmission/reception is effected due to the fact that the microcomputer 30 cooperates with the memory 29 and the control unit 21.

These circuit components are encapsulated by plastics etc. to present a card shape in whole appearance.

With this construction, a magnetic signal serving as both power and clock signals is fed from the card processing unit 1 toward the IC card 2, and a magnetic signal for data transmission/reception is transmitted and received between the card processing device 1 and the IC card 2. The magnetic signal serving as both power and clock signals has a frequency identical to a frequency based on an operating frequency of the microcomputer or obtained by multiplying it by integer. For instance, the magnetic signal has a frequency of 4.9152 MHz. Further, the magnitude of the magnetic signal is determined in consideration of power dissipation in the IC card 2.

On the other hand, both magnetic signals indicative of data from the card processing device 1 to the IC card 2 and vice versa are transmitted as a serial signal and then converted into a parallel signal thereafter to be signal-processed. When an attention is drawn to this signal flow, a signal from the card processing device 1 to the IC card 2 is received by the transducer 25 and thereafter level adjustment is effected by the input amplifier 26. Then, the signal thus level-adjusted is fed to the microcomputer 30 through the control unit 21. The microcomputer 30 receives a serial input to effect serial/parallel conversion in accordance with a control program assembled therein to execute various kinds of data processing and write data into the memory 29 according to need. Further, when data is transmitted from the IC card 2 to the card processing device 1, the serially converted data is supplied from the microcomputer 30 to the plane coil 28 for data output through the control unit 21 and the output amplifier 27, and then are transmitted toward the card processing device 1.

A suitable element constituting each of transducer elements 16 and 25 provided in the card processing device 1 and the IC card 2, respectively, for receiving this data magnetic signal is e.g. Hall element. The reason why the Hall element is employed is that it has a square waveform as a detector output for a magnetic signal to eliminate a signal regenerative circuit, and can be integrated together with peripheral circuits, thus enabling to be small-sized and simplified. An element except for Hall element may be used if it has the same function as that of the Hall element. It is to be noted that because the element 16 is not relatively required to be small-sized, a suitable winding may be instead used.

Figure 2A:
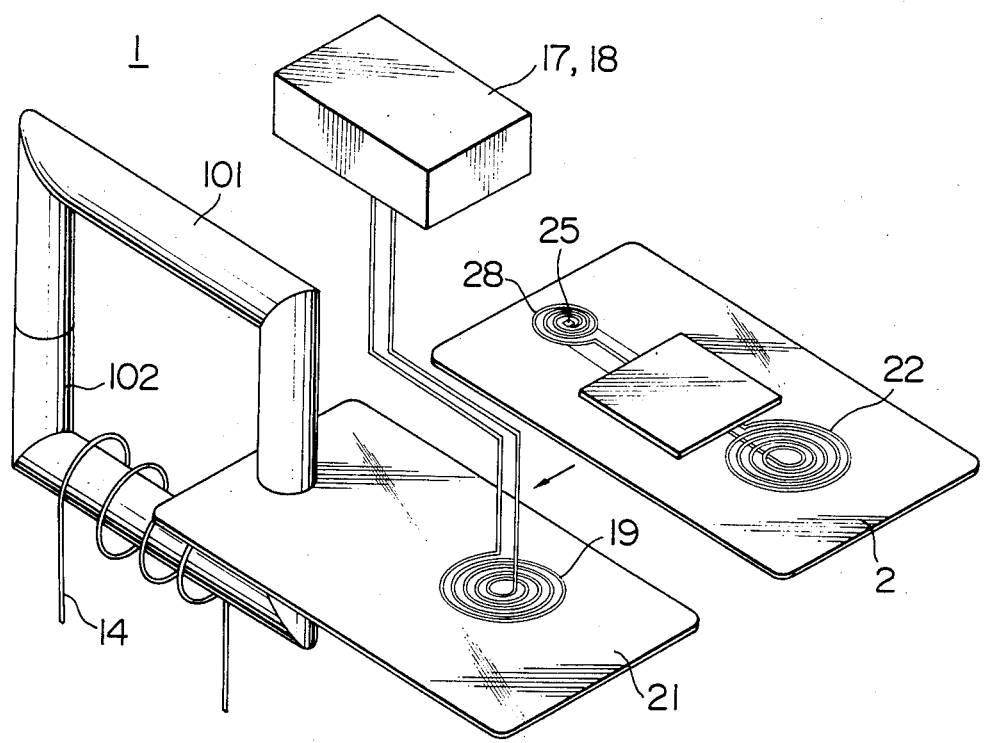
FIGS. 2A and 2B are explanatory views each illustrating how an IC card is inserted into a processing device for IC card according to the present invention to perform processing operation.
Figure 2B:
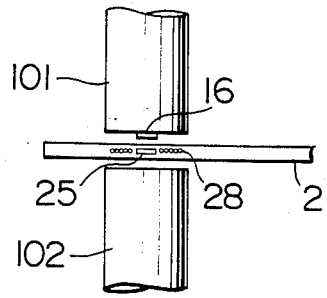

Referring to FIGS. 2A and 2B, there is shown how the IC card is inserted into the processing device for IC card according to the present invention to perform a processing operation. In these figures the whole construction of the processing unit 1 is not shown, and a power circuit comprising a winding 19 for power transmission and power transmission circuits 17 and 18, and a data transmission/reception circuit comprising ferrite cores 101 and 102, the winding 14 and the Hall element 16 are shown as typical circuit components of the processing device 1. The winding 19 for power transmission and a magnetic gap provided in the ferrite core 101 are arranged so that they are coplanar with each other. The Hall element 16 is provided in the central portion of the end surface of ferrite core 101 or 102 facing the magnetic gap. In correspondence with this, the winding 22 for power reception, the Hall element 25 for data input and the winding 28 for data output are provided on the surface of the IC card 2.

Thus, when the IC card 2 is inserted into a predetermined position of the processing device 1, the power system and the data transmission/reception system are associated or coupled between the processing device 1 and the IC card 2.

Referring to FIG. 3, there is shown circuit construction for the power supply system and the data transmission/reception system provided in the processing device 1 and the IC card 2 shown in FIGS. 2A and 2B. In this figure, the processing device 1 is shown on the left while the IC card 2 is shown on the right with the double dotted line in the center of the figure being as the border line. It is assumed that the IC card 2 is already inserted into the processing unit 1.

The power supply system is initially referred to. A high frequency power supply is effected to the plane winding 19 for power supply by the oscillator 18 in accordance with the clock signal having a frequency of 4.9152 MHz fed from the clock signal generator 17. Namely, when the clock signal is H, the diode $D_1$ turns off and the diode $D_2$ turns on, so that the transistor $Q_{11}$ turns on. As a result, the transistor $Q_{21}$ turns on, while the transistor $Q_{12}$ turns off. Accordingly, the transistor $Q_{22}$ also turns off. On the contrary, when the clock signal becomes L, the diode $D_1$ turns on and the diode $D_2$ turns off. As a result, the transistor $Q_{11}$ turns off, so that the transistor $Q_{21}$ turns off. On the other hand, the transistor $Q_{12}$ turns on, so that the transistor $Q_{22}$ turns on. As a result, the FET $Q_{23}$ effects on-off operation at a frequency of 4.9152 MHz to energize the winding 19.

Thus, a high frequency current is induced in the winding 22 for receiving power provided in the IC card 2. The high frequency current thus induced is outputted on the one hand as a clock signal, and is rectified by the diode $D_3$ on the other hand to pass through a smoothing circuit to be supplied to a constant voltage circuit 23A thereafter to be changed to a constant voltage output. The constant voltage output thus obtained is supplied to each circuit provided in the IC card 2 through a noise eliminating circuit.

Reference is made to the data transmission/reception system. The data transmission system from the IC card 2 to the processing device 1 will be first described. When a data signal of 9600 BPS (Bits Per Second) is supplied from the control unit 21 to the output amplifier 27, the data signal is supplied on the one hand to the transistor $Q_{28}$ through an inverter $INV_2$, and is directly supplied on the other hand to the transistor $Q_{27}$. Thus, this turns on and off the transistors $Q_{27}$ and $Q_{28}$ with them being 180° out of phase with each other to energize the winding 28 for data output in the forward and reverse directions. Thus, a magnetic field directed in the forward and reverse directions is produced in the winding 28. The magnetic field thus produced is detected by the Hall element 16 provided in the processing device 1 and then amplified by the transistor $Q_{24}$ provided in the input amplifier 15 to be supplied to the control unit 11. The unit amplifier 15 has a variable resistor $VR_1$ for zero adjustment of the Hall element 16 and a variable resistor $VR_2$ for gain adjustment of the input amplifier 15.

Then, the data transmission system from the processing device 1 to the IC card 2 will be now described. When a data signal of 9600 BPS is supplied from the control unit 11 to the output amplifier 13, the data signal is fed to the transistor $Q_{25}$ through an inverter $INV_1$, and is directly fed to the transistor $Q_{26}$. Thus, the transistors $Q_{25}$ and $Q_{26}$ effect on-off operation with they being 180° out of phase with each other thereby to energize the winding 14 for data output in the forward and reverse directions. As a result, a magnetic field directed in the forward and reverse directions is produced in the winding 14. The magnetic field thus produced is detected by the Hall element 25 provided in the IC card 2 and then amplified by the transistor $Q_{29}$ provided in the input amplifier 26 to be outputted to the control unit 21. Similar to the input amplifier 15 provided in the processing device 1, in the input amplifier 26, gain adjustment and zero adjustment of the Hall element is carried out with the variable resistors $VR_3$ and $VR_4$.

As stated above, the present invention is characterized in that a magnetic signal indicative of power and clock is transmitted from the card processing device towards the IC card, and in that a magnetic signal indicative of data is transmitted and received between the card processing device and the IC card. Accordingly, this makes it possible to effect IC card processing so that the function identical to that of contact system can be performed while eliminating drawbacks with the prior art contact system.

APPLICABILITY IN INDUSTRY

The IC card according to the present invention can substitute for conventional magnetic cards. The IC card of the invention can be utilized for e.g. cash cards for bank, credit cards or identification cards etc. and is dealt with a large quantity of information as compared with the magnetic cards. The card processing device supplies power to the IC card, and transmits data to the IC card and receives it therefrom to perform functions required for the above-mentioned various kinds of cards.

We claim:

1. A processing device for an IC card designed so as to supply power and clock signals to an integrated circuit (IC) card on which an electronic circuit including a microcomputer and a memory is mounted and to transmit data to said IC card and receive data therefrom, thus processing said IC card, comprising:
   (a) an oscillator for producing an output having a predetermined frequency on the basis of said clock signal,
   (b) a first winding for producing a magnetic signal corresponding to the output of said oscillator,
   (c) a second winding for producing a magnetic signal indicative of data to be supplied to said IC card, and
   (d) a transducer means, comprising a Hall element, for receiving the magnetic signal indicative of data supplied from said ID card.

2. An integrated circuit (IC) card on which an electronic circuit including a microcomputer and a memory is mounted to transmit data to a card processing device and to receive data therefrom in a noncontact manner by supplying power and clock signals from said card processing device in a non-contact manner, comprising:
   (a) a circuit having a first winding, a power supply circuit and a clock signal pick-up circuit to receive a magnetic signal having a frequency with a predetermined relationship with that of said clock signal to form a d.c. voltage and a clock signal,
   (b) transducer means, comprising a Hall element, for receiving a magnetic signal indicative of data fed from said processing device, and
   (c) a second winding for forming a magnetic signal indicative of data to be fed to said processing device.

* * * * *